No. 814,485. PATENTED MAR. 6, 1906.
T. VICARS & J. VICARS, THE YOUNGER.
BISCUIT STAMPING AND CUTTING MACHINE.
APPLICATION FILED NOV. 23, 1903.
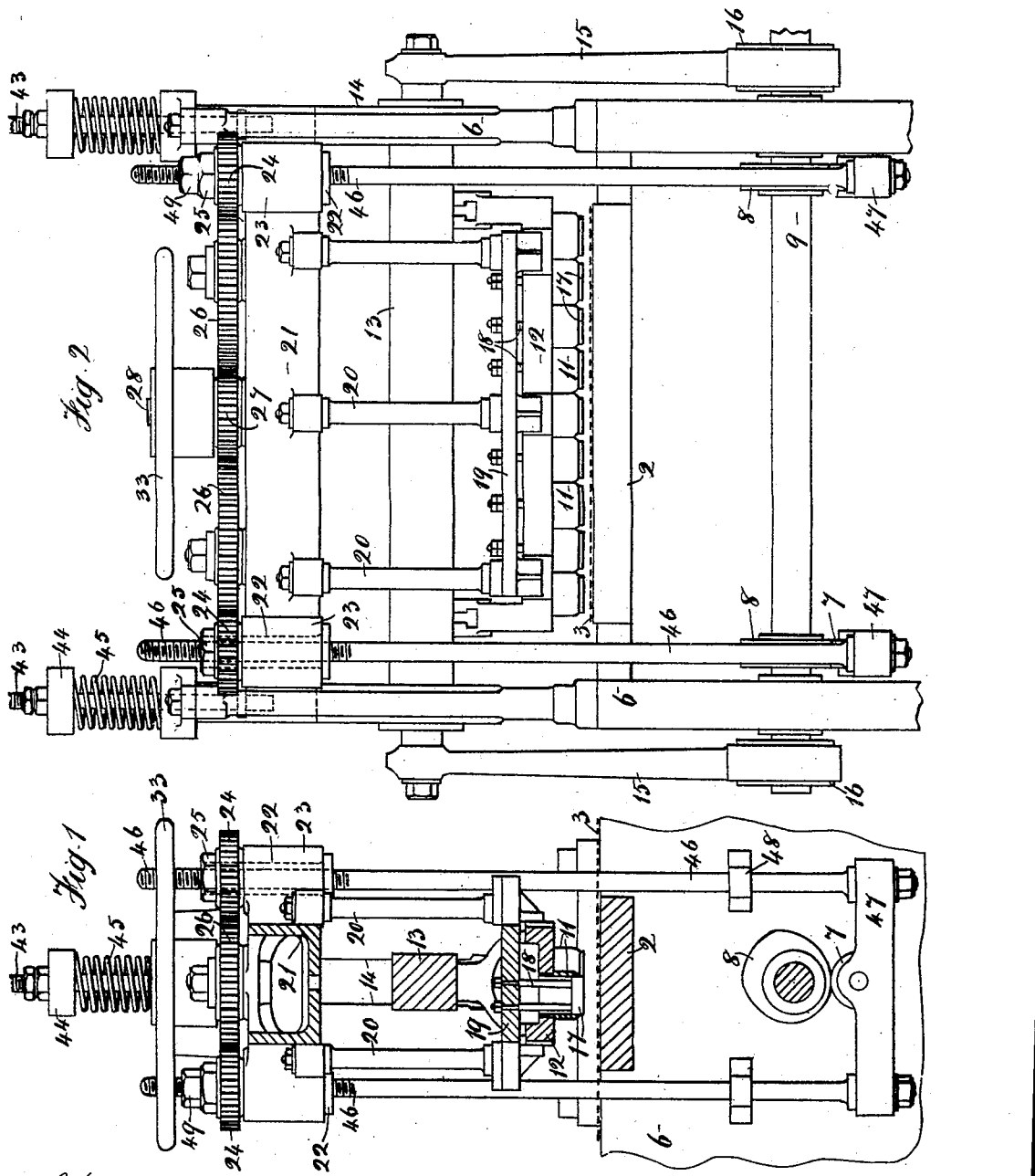
Witnesses
W. B. Johnson
H. Lightfoot
Inventors
Thomas Vicars
John Vicars The Younger

UNITED STATES PATENT OFFICE.

THOMAS VICARS AND JOHN VICARS, THE YOUNGER, OF EARLESTOWN, ENGLAND.

BISCUIT STAMPING AND CUTTING MACHINE.

No. 814,485. Specification of Letters Patent. Patented March 6, 1906.

Application filed November 23, 1903. Serial No. 182,345.

*To all whom it may concern:*

Be it known that we, THOMAS VICARS and JOHN VICARS, the Younger, subjects of the King of Great Britain, residing at Earlestown, in the county of Lancaster, England, have invented new and useful Improvements in Biscuit Stamping and Cutting Machines, of which the following is a specification.

The invention relates to machines in which hollow cutters surrounding the stamps, embossors, or impressors act first to detach or strip off the stamped sheet of dough from the stamps and then complete the cutting out of the biscuits from the sheet; and our invention consists in arrangements of parts with the object of adjusting the machines for various thicknesses of biscuits. We attain this object by mechanism such as is illustrated on the accompanying drawings, wherein—

Figure 1 is a central longitudinal section, and Fig. 2 an end view, of a portion of a biscuit-cutting machine embodying our invention.

The drawings only show the cutting and stamping parts of the machine, the remaining parts for traversing the sheet of dough, removing the biscuits, and other operations connected with the manufacture not being shown, as they are of any usual kind.

Referring to the drawings, 2 is the cutting-table, over which the sheet of dough 3 is caused to travel intermittently in the usual way. The table 2 is fixed to the main framework 6.

11 represents the cutters, fixed to a bar 12, which is secured to a cross-head 13, which is movable up and down in slides 14 in the frame 6 in the usual way by rods 15 connected thereto and to the eccentrics 16, secured to the shaft 9, which latter is rotated by any suitable gearing.

17 represents the stamps or impressors for stamping the design on the biscuits, secured by rods 18 to a plate 19, which is in turn connected by rods 20 to a cross-head 21, which is free to slide in slides 14 in the frame 6.

43 represents rods secured to the cross-head 21 and provided with collars 44, against which press springs 45, so that the cross-head and stamps always tend to be lifted up.

46 represents rods screwed at their upper ends and engaging with internally-screwed sleeves 22, which are rotatable in bosses or bearings 23 on the cross-head 21.

24 represents toothed wheels secured to the sleeves 22 by nuts 25 or otherwise, as convenient. The wheels 24 gear into idle-wheels 26, which in turn gear with a toothed pinion 27, mounted on a pin 28 on the cross-head.

33 is a hand-wheel secured to the pinion 27. Thus by rotating the hand-wheel 33 the sleeves 22 are rotated and the rods 20, plate 19, rods 18, and stamps 17 are moved up or down, so that the stamps are adjusted to any desired distance from the table 2 for various thicknesses of biscuits.

Stripping-plates for stripping the dough from the outside of the cutters may be used; but these may be of any usual kind and for clearness are not shown.

The lower ends of the rods 46 are attached to heads 47, movable in guides 48 and carrying rollers 7, which bear against cams 8 on the shaft 9, so that such cams can draw down the stamps 17 against the compression of the springs 45.

Instead of springs 45 being used to raise the stamps, cam mechanism might be used for that purpose, and also instead of using eccentrics 16 for raising the table cam mechanism might be advantageously used.

49 is a lock-nut on the rod 46 to prevent slacking back of the sleeves 22.

The action of the parts is as follows: The stamps first descend and impress the design on the sheet of dough. The cutters then descend and as the edges touch the dough the stamps begin to rise and the cutters strip off the dough from the stamps and the cutters still descending cut out the biscuits. The cutters and stamps then rise to their highest position, the sheet of dough is advanced, and the operation is repeated.

Instead of the regulating-sleeves 22 and their gearing being applied to the rods 46, they may, as will be obvious, be applied to the rods 20.

Our invention is not confined to the exact details of construction above described, as it will be obvious that many different equivalent arrangements of regulating mechanism may be used at any convenient point in the connections between the operating-shaft and the stamps without departing from the nature of our invention.

We do not claim, broadly, the method of first stamping and afterward cutting out biscuits; but What we do claim, and desire to secure by Letters Patent, is—

In combination with biscuit stamping and cutting machines having independently-reciprocating stamps and cutters, the stamps being disposed within the cutters, regulating devices on the connections between the stamps and their operating-gear, and mechanism for operating all the regulating devices simultaneously to regulate the position of the stamps relative to the surface of the cutting-table; substantially as described.

In testimony whereof we have signed our names to this specification in the presence of two subscribing witnesses.

THOMAS VICARS.
JOHN VICARS, THE YOUNGER.

Witnesses:
W. B. JOHNSON,
H. LIGHTFOOT.